July 16, 1957 J. M. BRADLEY 2,799,358
RECOVERY OF PIGMENTS UNDER PRESSURE
Filed Dec. 22, 1955
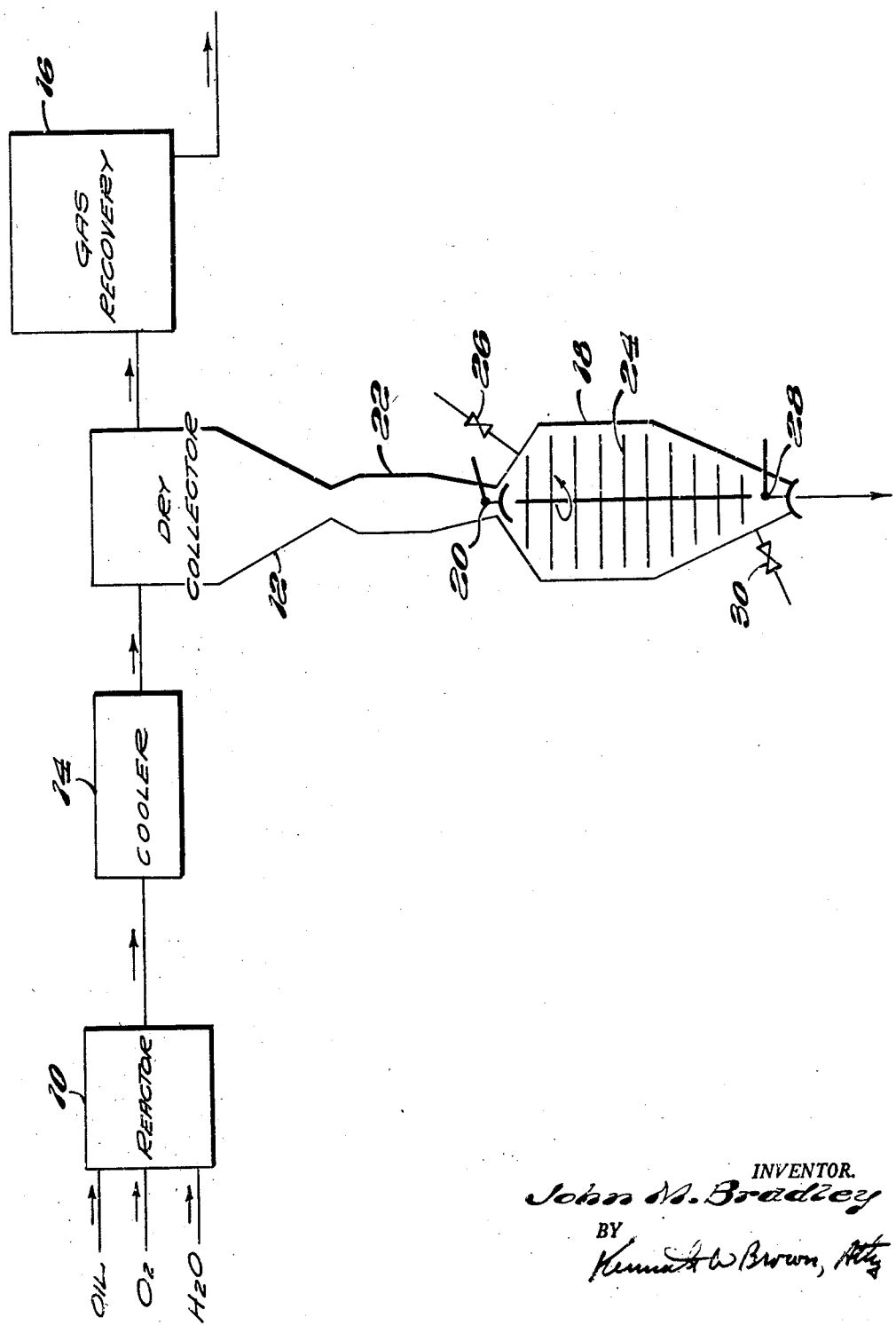
INVENTOR.
John M. Bradley
BY
Kenneth W. Brown, Atty

2,799,358
RECOVERY OF PIGMENTS UNDER PRESSURE

John M. Bradley, Pampa, Tex., assignor to Godfrey L. Cabot, Inc., Boston, Mass., a corporation of Massachusetts Application December 22, 1955, Serial No. 554,819

4 Claims. (Cl. 183—85)

This invention relates to a novel process for recovering finely-divided pigments from flowing streams of gases in which suspended under superatmospheric pressure. It is particularly adapted to the recovery of carbon black produced in high pressure processes, for example, as a product of synthesis gas productions.

In the production of nitrogen-free synthesis gas, for use in ammonia and methanol production, for example, a hydrocarbon is customarily burned with essentially pure oxygen under high pressure. Carbon black is inevitably obtained as a coproduct and in fact may be the primary product of the process. Because of the high pressure employed the recovery of the carbon black presents a serious problem. In presently practised processes the gases from the reactor must be scrubbed with water because heretofore no satisfactory alternative method has been proposed for liberating the carbon black from the high pressure gas stream. Conventional methods of aerosol separation can not be used because inflammable and poisonous gases would inevitably escape with the carbon black from the system.

While water scrubbing of the reactor effluent effectively removes the carbon black from the gases it creates another separation problem, which is to separate the black from the scrub water. The resulting slurry is very dilute so that settling at best concentrates the black to no more than about 2% and the best filtration can achieve is about 10% concentration. Thereafter, drying remains as the only final step to recovery and this is very expensive. The problem is similar for high pressure vapor phase production of other finely divided pigments such as metal oxides which must be separated from gases containing HCl or other corrosive gases.

It is the principal object of my invention to provide a new process for recovering finely-divided pigments in the substantially dry state from aerosols flowing under pressure.

It is a specific object of this invention to provide such a process for the recovery of carbon black from synthesis gas coproduced under pressure.

It is a further object of this invention to provide such a process whereby the finely-divided pigment is recovered in a state substantially free of occluded harmful gases.

The process of my invention is carried out by flowing the aerosol stream under substantially the same pressure as when produced through a suitable collection zone of conventional type constructed to withstand the pressures to which subjected. The pigment is separated from the carrier gases in this zone and is then conducted through an open seal valve to an accumulation zone. Here the pigment is allowed to collect to an appropriate amount whereupon the seal valve to the collector is closed, the pressure in the accumulator is released and the pigment is withdrawn through an opened seal valve at the discharge end of the accumulator. During its residence in the accumulation zone the pigment is flushed with steam or other gas which can be tolerated both in the carrier gas from which the pigment has been separated and in the pigment to remove occluded gases from its surfaces. During the flushing period the body of pigment must be stirred to prevent channeling of gas through the bed and hence to provide uniform contact between gas and pigment particles.

This invention may further be illustrated by means of the accompanying drawing which is a diagrammatic representation of apparatus organized for carrying out the process of this invention for the production of synthesis gas and carbon black.

Hydrocarbon oil, oxygen and a diluent gas such as steam or recycled tail gas are introduced into reactor 10, in proportions appropriate for the production of the desired product, at elevated pressure. Reactor 10 is a heat insulated furnace in which the oil is burned under conditions of incomplete combustion to provide a maximum of synthesis gas. Carbon black is inevitably formed at the same time and operating conditions are selected to favor production of the desired type of carbon black if that is to be the primary product. The effluent from the reactor 10 is then conducted to a dry collector 12, first through an optional cooler 14 if preferred, wherein the carbon black is separated from the synthesis gas. Collector 12 is preferably one or more cyclone separators of known design, or a filter. The gases then flow to recovery unit 16 while the separated carbon black drops into accumulator vessel 18 through seal valve 20 which is in open position. An intermediate hold up vessel 22 may be provided between collector 12 and accumulator 18 if necessary to hold the black while the accumulator is being emptied. Stirring dasher 24, rotated by any convenient external source of power (not shown), is preferably included in the accumulator for the dual purpose of improving the efficiency of flushing and of densifying the black. When the accumulator 18 is filled to the desired level, valve 20 is closed and vent valve 26 is opened to release the pressure within the accumulator to that of the atmosphere, or substantially so. Discharge valve 28 in the bottom is then opened to release the black and then closed again whereupon valve 20 is again opened to permit more carbon black to flow into the accumulator. An inlet valve 30 is provided in the wall of accumulator 18 at a point opposite vent valve 26 to provide for introduction of a flushing gas into the bed of black. For synthesis gas-carbon black systems steam will ordinarily be employed for this purpose as it is returned to the pigment-free gas line upwardly through dry collector 12 and will aid in the formation of hydrogen from the synthesis gas.

It will be appreciated that this novel high pressure collection process is applicable to situations other than the production of synthesis gas. For instance, formation of carbon black and metal oxides under pressure may lead to improved yields and interesting new products. Furthermore, it may be highly advantageous to recover power from high pressure tail gases as by driving gas turbines. In such situation it is obvious that it would be most undesirable to flow the pigments through the turbine rotors, hence prior removal is important.

Having thus described my invention, I claim:

1. A process for recovering finely-divided pigments from a gaseous suspension thereof in a system of elevated pressure which comprises, separating the pigment from the gases in which suspended, accumulating the pigment while still under the pressure of the system, stirring the accumulated pigment and flushing same with a gas compatible with both pigment and suspending gases, periodically isolating the accumulated pigment from the system of elevated pressure, reducing the pressure on the pigment to that of the surrounding atmosphere and recovering the pigment thus isolated.

2. A process for recovering carbon black from a synthesis gas aerosol flowing under superatmospheric pressure which comprises cyclonically separating the carbon black from the gas at such pressure, accumulating said separated carbon black at said pressure in a zone distinct from that of separation, stirring and flushing the carbon black with a gas compatible with both carbon black and synthesis gas, periodically isolating the accumulated carbon black from the separation zone, reducing the pressure on the isolated carbon black to that of the surrounding atmosphere, and recovering the isolated carbon black.

3. The process of claim 2 in which the flushing gas is selected from the group consisting of synthesis gas and steam.

4. A separation system for gas-solids aerosols flowing under superatmospheric pressure, comprising in combination a source of aerosol under pressure, a gas-solids separator connected to said aerosol source, means to conduct gas away from the separator and to recover the gas, a solids accumulator connected to the solids discharge conduit of the separator, stirring means within the accumulator, means to introduce a flushing gas under pressure thereinto, substantially gas-tight means to isolate the accumulator from the separator, means to relieve pressure within the accumulator and means to discharge solids from the accumulator.

References Cited in the file of this patent
UNITED STATES PATENTS 2,717,658      Bethea et al. _____ Sept. 13, 1955